Dec. 9, 1924.　　　　　　　　　　　　　　　1,518,161
R. B. OTWELL
TRACTOR
Filed May 9, 1921　　　　4 Sheets-Sheet 1

Inventor
Ralph B. Otwell
By S. E. Thomas
Attorney

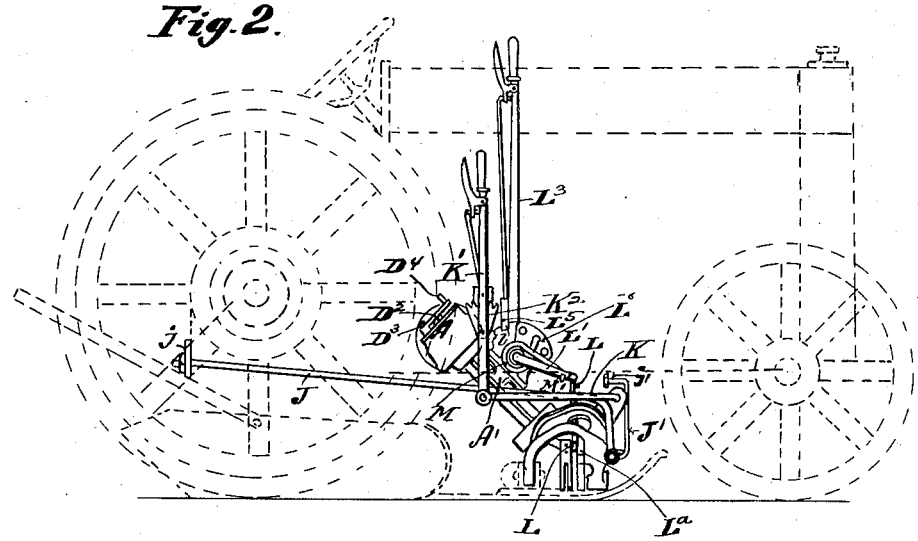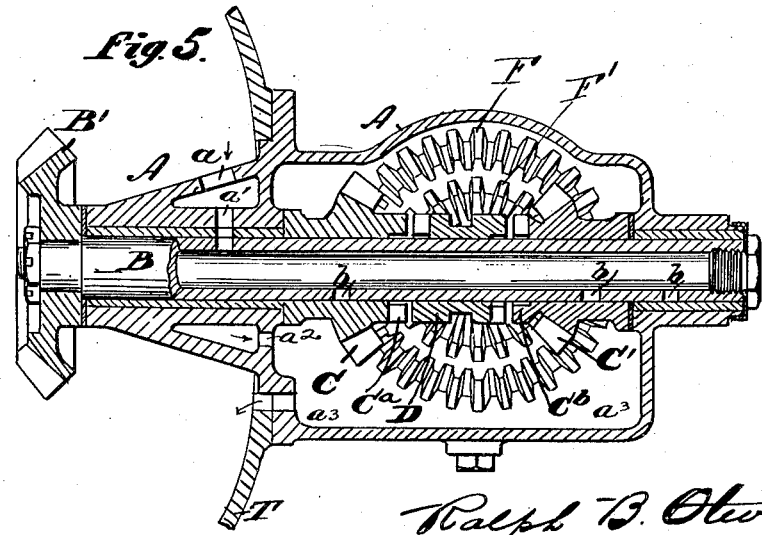

Dec. 9, 1924.
R. B. OTWELL
TRACTOR
Filed May 9, 1921 4 Sheets-Sheet 3
1,518,161
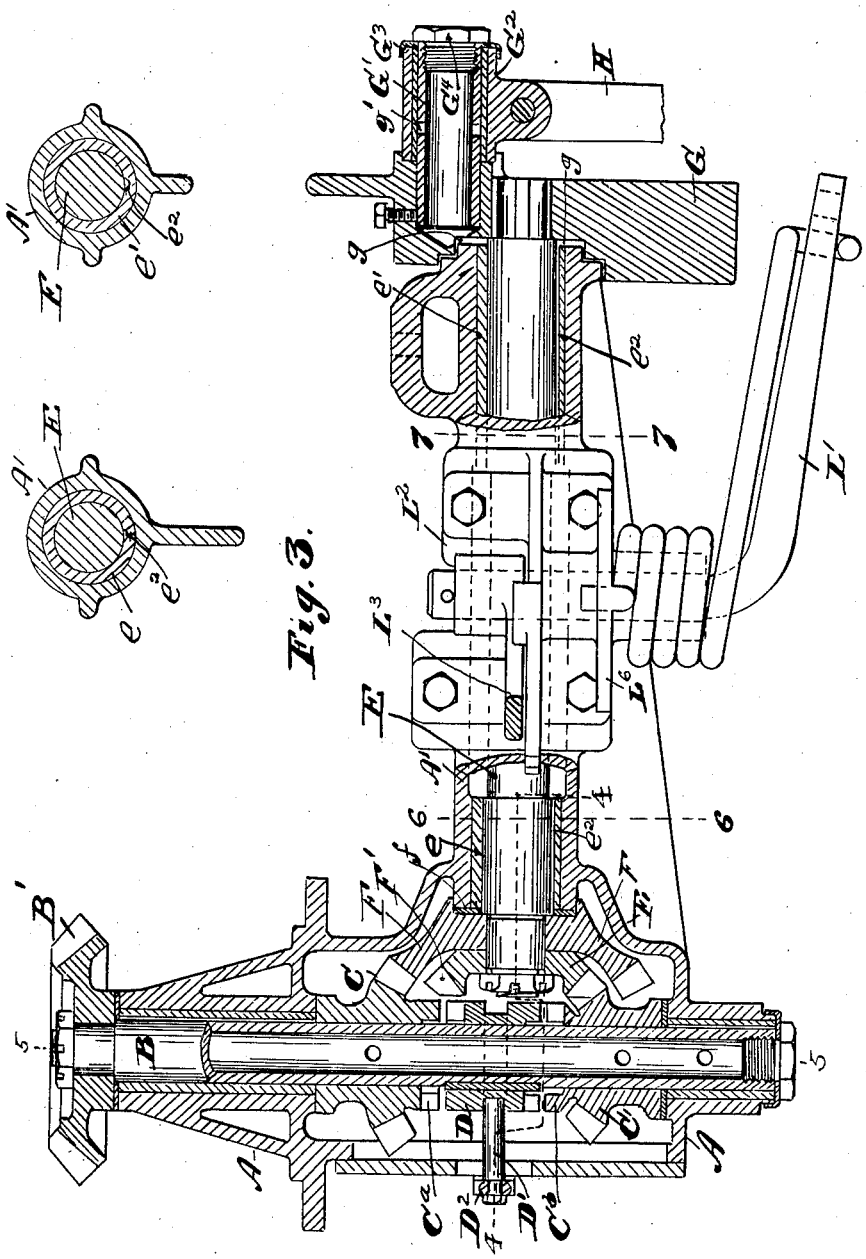

Dec. 9, 1924.

R. B. OTWELL

TRACTOR

Filed May 9, 1921

Inventor
Ralph B. Otwell
By J. E. Thomas
Attorney

Patented Dec. 9, 1924.

1,518,161

UNITED STATES PATENT OFFICE.

RALPH B. OTWELL, OF DETROIT, MICHIGAN.

TRACTOR.

Application filed May 9, 1921. Serial No. 467,817.

*To all whom it may concern:*

Be it known that I, RALPH B. OTWELL, a citizen of the United States, residing at Detroit, county of Wayne, State of Michigan, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

My invention relates to an improvement in tractors whereby the cutter bar of a mowing attachment may be driven directly from the take-off gear of the tractor through an attachment which is rigidly secured to the tractor but which may be readily removed if desired.

One object of the present invention is an improvement in the general construction of the attachment shown in my co-pending application, Serial No. 360,037 filed February 20, 1920.

A further object of the invention is to provide a self-contained power unit which may be rigidly bolted to the tractor frame by the operator without the necessity of first assembling and then adjusting a plurality of parts to insure the proper operation of the machine.

A further object of the invention is to provide means whereby the several movable parts contained in the casing of the power take-off extension may be automatically lubricated directly from the oiling system of the tractor.

A further object of the invention is to provide means adapted to relieve the shock or strain upon the cutter bar and other parts of the device, due to encountering an obstruction while mowing.

A further object is to provide a resilient supporting arm connected with the mower attachment which may be adjusted to increase the resiliency of the arm to assist the operator in lifting the mower bar upon manually operating the lever controlling the same.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings:

Figure 2 is a view in side elevation of the device, with certain parts of the mowing attachment and the tractor shown in dotted lines.

Figure 3 is a view partially in section and partially in elevation of the extension of the power shaft and clutch, the supporting casing for same bolted to the tractor, the main driving shaft, the pitman take-off and the adjustable spring arm connected with the mower attachment.

Figure 5 is a view partially in section and partially in elevation of the extension of the power shaft and clutch mechanism housed in the supporting casing bolted to the wall of the tractor, taken on or about line 5—5 of Figure 3.

Figure 6 is a cross-sectional view on or about line 6—6 of Figure 3, showing the oil duct through one of the supporting bushings in the casing which houses the main driving shaft and Figure 7 is a similar cross-sectional view taken on or about line 7—7 of Figure 3 showing the oil duct for delivering oil to the end of the shaft.

Figure 1:
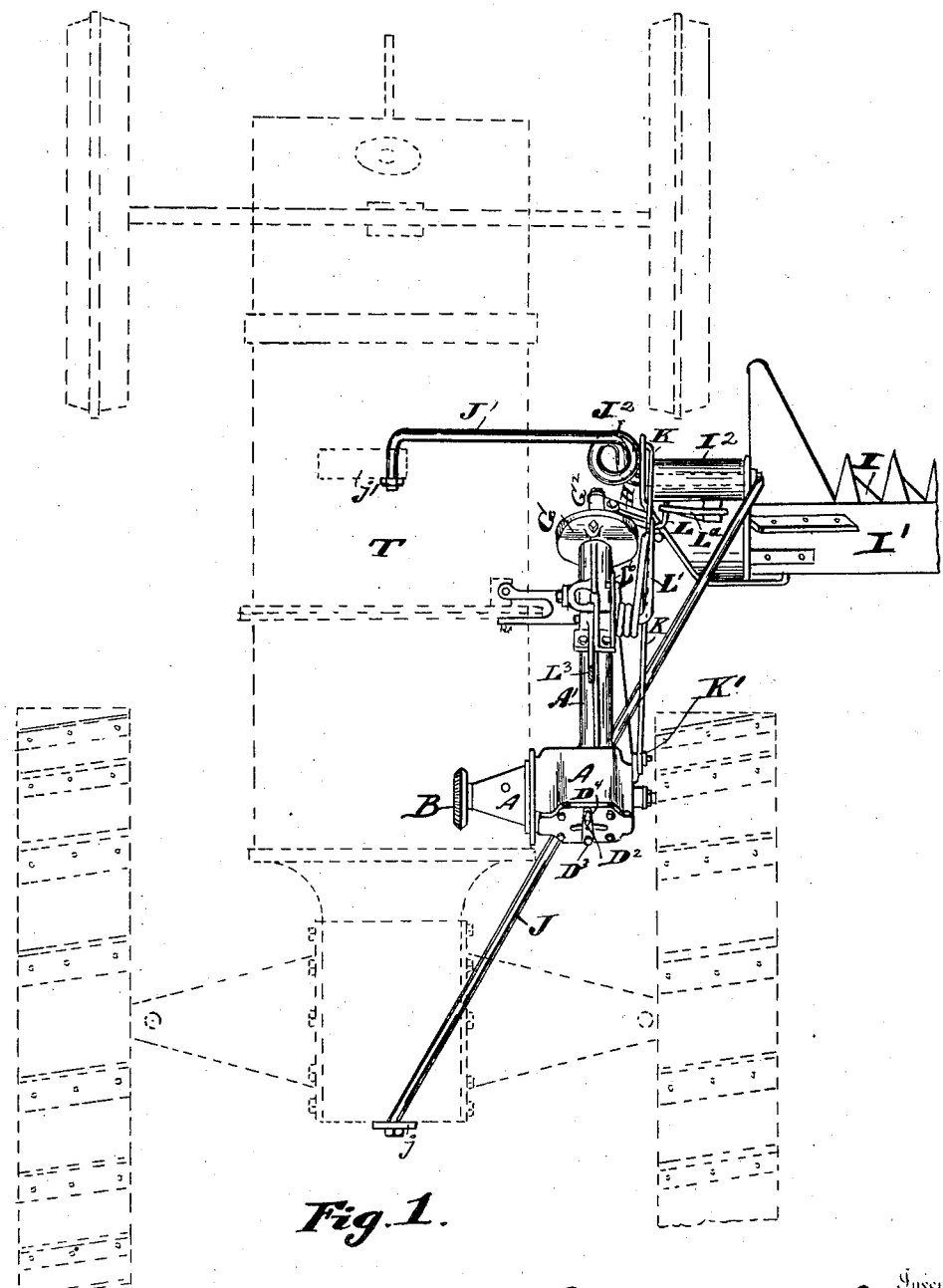
Figure 1 is a plan view of the device embodying my invention, applied to a tractor,—indicated in dotted lines.
Figure 4:
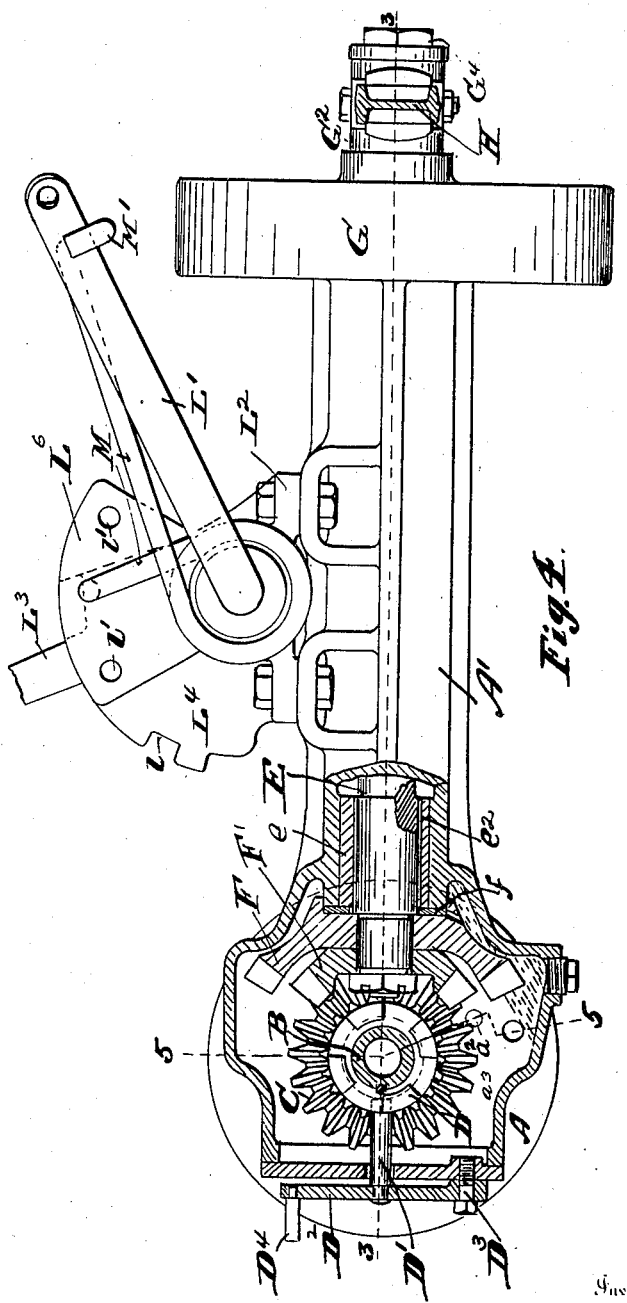
Figure 4 is a view partially in section and partially in elevation of the mechanism indicated in Figure 3, taken on or about line 4—4 of Fig. 3.

Referring now to the letters of reference placed upon the drawings:

To a tractor T is bolted a casing A inclosing an extension B of the main power take-off shaft, driven by a bevel gear B', from suitable gearing (not shown) actuated by the main power take-off gear the latter being in turn operated by the drive shaft of the tractor. Keyed upon the tubular extension B of the power take-off shaft are a pair of bevel gears C and C' spaced apart and respectively provided with clutch faces $C^a$ and $C^b$. D is a clutch collar reciprocable and non-rotatable on the extension shaft B adapted to alternately engage the respective clutch faces $C^a$ and $C^b$ of the gears C and C'. D' is a pin projecting from a peripheral groove in the slidable collar through a slotted opening in the end of the casing for connection with a swinging arm D² pivoted at D³ to the wall of the casing. D⁴ is a handle fitted to the swinging arm for manually shifting the clutch member alternately into engagement with the clutch faces Cᵃ and Cᵇ of the respective bevel gears. A′ is a lateral extension of the casing A in which is housed a main driving shaft E, journaled in bearings e and e′ at each end of the casing. Keyed to the end of the driving shaft E, is a bevel gear F in mesh with the gear C on the take-off shaft and F′ is a second and relatively smaller gear keyed on the shaft E in mesh with the gear C′ on the take-off shaft. A pitman wheel G is keyed or otherwise made fast to the main driving shaft E. The pitman wheel G is provided with a projecting tubular crank pin G′ on which is sleeved a sleeve G². G³ is a washer overlapping the end of the sleeve and G⁴ is a cap nut engaging the crank pin to secure the sleeve against dislodgement. H, is a pitman rod pivoted to the sleeve G² and to the knife I, of the mower bar I′. To provide for the delivery of oil from the oiling system of the tractor that the several parts just described may be lubricated, an aperture a is formed in the wall of the casing A opening into the transmission gear case of the tractor. Through this opening the oil passes from the tractor into the casing A, thence through an opening a′ into the tubular extension of the shaft B, in turn provided with apertures b, for the discharge of oil along the bearing surface of the shaft. a² indicates another opening in the casing A whereby oil may pass into the gear chamber a³ and flow over the thrust washer f through the groove e² into the lateral extension A′, of the casing A to lubricate the power shaft E. The oil also passes through a groove e² in the bearing e′ at the end of the casing housing, thence through a channel g, into the tubular crank pin G′, and out through an opening g′ in the pin to lubricate the sleeve G² mounted thereon. The rear end of a brace member J is rigidly secured to a hanger j depending from the rear end of the tractor to which it is attached so as to lie in the central, longitudinal axial plane of the latter. The forward end of the brace J is pivoted to the heel yoke I² of the mower bar. J′ is a resilient brace extending laterally from a bracket j′ bolted on the underside of the tractor frame in line with the longitudinal axial plane of the latter. Adjacent to its outer laterally extending end the brace J is coiled to form a spring J² and pivotally mounted upon the end of the brace is the heel yoke I² of the mower bar that the latter may be relieved of any undue strain upon encountering an obstruction. The heel yoke of the mower bar may be oscillated upon the end of the arm by means of a link K connecting the heel yoke with a hand lever K′, pivoted on a segment K², secured to the frame of the machine.

The mower bar I′ is hinged on the heel plate in the usual manner and may be tilted up and down through the medium of a link L connected to a lever arm L′ journaled in a casting L² bolted to the lateral extension A′ of the casing A and to a rocker arm Lᵃ;—the lever arm L′ being operated by a hand lever L³ pivoted to a segment L⁴. The hand lever L³ is held in its adjusted position by a suitable dog L⁵ which is adapted to co-operate with the notches l formed in the segment. L⁶ is a segment spaced from the segment L⁴, (or it may be integral therewith) provided with a plurality of apertures l′ to receive one end of a spring M coiled on the bearing of the lever arm L′, the spring having a hook M′ to engage the arm to urge the latter upwardly. It will be understood that by shifting the end of the spring into any one of the several apertures l′ of the segment the tension of the spring may be regulated as required to assist the operator in manually raising the cutter bar.

It will now be seen that the device comprises a unit structure in itself which may be quickly and readily secured to the tractor body by unskilled labor so as to communicate all drafts to the medial longitudinal axis of the tractor,—while all undue shocks or strains upon the cutter bar are absorbed through the action of the resilient supporting brace. So also when connected to the machine the working parts of the attachment are lubricated by the oiling system of the tractor without further attention upon the part of the operator. When the mower is attached, the latter lies at substantially the center of oscillation longitudinally of the machine while the means for lifting the mower bar is materially assisted by the spring arm M which serves to relieve the operator of much of the effort that would otherwise be required to raise the cutter bar.

Having thus described my invention what I claim is:—

1. In a tractor fitted with a power take-off gear, a casing within the tractor, an extension shaft geared to the power take-off gear, a casing extension projecting beyond the tractor in which the extension shaft is journaled integral with the casing having a lateral extension therefrom to receive a driven member, a driven member journaled in the lateral extension of the casing geared to the extension shaft, a clutch slidable in the extension casing for connecting and disconnecting the gearing of the extension shaft with the gearing of the driven member, and a mowing machine attachment including a cutter bar having operative connection with the driven member.

2. In a tractor fitted with a power take-off gear, a casing within the tractor, an extension shaft geared to the power take-off gear, a casing extension projecting beyond the tractor in which the extension shaft is journaled integral with the casing having a lateral extension therefrom to receive a driven member, a driven member journaled in the lateral extension of the casing geared to the extension shaft, a clutch slidable in the extension casing for connecting and disconnecting the gearing of the extension shaft with the gearing of the driven member, a mowing machine attachment including a cutter bar having operative connection with the driven member, and means for conducting oil from the casing to the casing extension, whereby the movable parts housed in the casing extension and its lateral extension may be lubricated.

3. In a tractor including a casing and a power take-off gear housed within the casing, an extension shaft geared to the power take-off gear, a casing extension integral with the casing, in which the extension shaft is journaled, said last named casing having a lateral extension to receive a driven member, a driven member journaled in the lateral extension of the casing and geared to the extension shaft, a clutch slidable in the extension casing for connecting and disconnecting the gearing of the extension shaft with the gearing of the driven member, a mowing machine attachment including a cutter bar having operative connection with the driven member, and resilient means for supporting the cutter bar in adjusted and operative relation to the power transmitting means adapted to transmit the draft of the cutter bar to the central longitudinal plane of the tractor.

4. In a tractor including a casing and a power take-off gear housed within the casing, an extension shaft geared to the power take-off gear, a casing extension integral with the casing in which the extension shaft is journaled, said last named casing having a lateral extension to receive a driven member, a driven member geared to the extension shaft journaled in the lateral extension of the casing, a clutch slidable in the extension casing for connecting and disconnecting the gearing of the extension shaft with the gearing of the driven member, a mowing machine attachment including a cutter bar having operative connection with the driven member, resilient means for supporting the cutter bar in adjusted and operative relation to the power transmitting means arranged to transmit the draft of the cutter bar to the central longitudinal plane of the tractor, and means for conducting oil from the tractor casing through the casing extension and lateral extension of the last named casing, whereby the several movable parts carried thereby may be lubricated.

5. In an attachmeint for tractors, a tractor casing, an extension casing adapted to be rigidly secured to the casing of the tractor, a take-off gear for the tractor, a tubular shaft driven from the take-off gear of the tractor journaled in said extension, a laterally extending power transmitting member also journaled in said extension casing and rotated by the first named shaft through the medium of a releasing clutch within the casing, means whereby oil may be conducted from the tractor casing through the casing extension and the tubular shaft to lubricate the parts in the extension casing, a control lever for actuating the clutch, a mower bar, a resilient brace member secured to the tractor in substantially the central medial plane thereof on which the mower bar is angularly adjustable, means for connecting the cutter bar of the mower attachment with the power transmitting member of the casing, and controlling and adjusting levers for the mower bar.

6. In an attachment for tractors, a tractor casing, an extension casing adapted to be secured to the tractor casing, a power take-off gear for the tractor, an extension power take-off member journaled in the extension casing geared to the power take-off gear of the tractor, a power transmitting member journaled in a transverse extension of the casing extension, driving connections in the casing between the extension power take-off member and the power transmitting member including a releasing clutch with control thereof on the casing, a resilient brace secured to the tractor at one end along the central medial plane thereof, a mower bar having a pivotal connection with the resilient brace at substantially the center of oscillation of the tractor with the cutter bar thereof operably connected with the power transmitting member, a brace member secured to the rear end of the tractor and to the mower bar, and levers for manipulating and adjusting the mower bar.

7. An attachment for tractors comprising a casing constructed for connection with a tractor, an extension power take-off member journaled in the casing, a power transmitting member journaled in a transverse extension of the casing arranged to be operated through an engaging and disengaging clutch, a mower bar the cutter of which is reciprocated through the power transmitting member, levers for adjusting and raising the mower bar, mounted upon the casing and its lateral extension, a spring adapted to co-act with one of the levers for raising the mower bar, and means for regulating the tension of the spring.

8. An attachment for tractors, comprising an extension power take-off shaft adapted to be actuated by the tractor, a driving member, supporting means secured to the tractor, for housing the extension power take-off shaft and driving member, means housed in the supporting means for detachably coupling the extension power take-off shaft with the driving member, means whereby oil may pass from the tractor through the housing of the power take-off shaft and driving member to lubricate the movable parts therein, a mower bar the cutter of which is operated by the driving member, and resilient draft means on which the mower bar is adjustable, adapted to transmit the draft strains and load of the mower bar to the tractor along the medial, vertical longitudinal plane thereof.

9. In a tractor fitted with a power take-off gear, a unit structure comprising a main casing extending beyond the tractor, including a lateral extension adapted to be secured to the tractor and lying outside thereof, an extension shaft journaled in the main casing and geared to the power take-off gear, a driven member journaled in the lateral extension geared to the extension shaft, a clutch slidable in the main casing for connecting and disconnecting the gearing of the extension shaft with the gearing of the driven member, a mowing machine attachment including a cutter bar, and means for adjusting the cutter bar.

10. In a tractor provided with a power takeoff gear, a casing secured to the tractor, an extension for the same provided with a laterally extending casing, a driven member journaled in the end of the laterally extending casing and means for connecting the same with the power takeoff gear, a mower bar pivotally secured to the tractor for vertical adjustment, means for adjusting the mower bar, and means carried by the last mentioned means for urging the mower bar to its elevated position.

11. In a tractor provided with a power takeoff gear, an integral L-shaped casing provided with transmission mechanism for taking power from the power takeoff gear, a driven member journaled in one arm of the L-shaped casing and connected to the transmission mechanism, a mower bar secured to the tractor to swing vertically, means for raising and lowering the mower bar, a spring normally urging the last mentioned means to its elevated position, and a segmental plate provided with openings to receive one end of the spring whereby the tension of the same may be adjusted.

In testimony whereof, I sign this specification in the presence of two witnesses.

RALPH B. OTWELL.

Witnesses:
S. E. THOMAS,
IDA GOREN.